Oct. 1, 1963  W. L. YOUNG, JR  3,105,439
PLASTIC SHOT GUN SHELL
Filed July 9, 1959  2 Sheets-Sheet 1
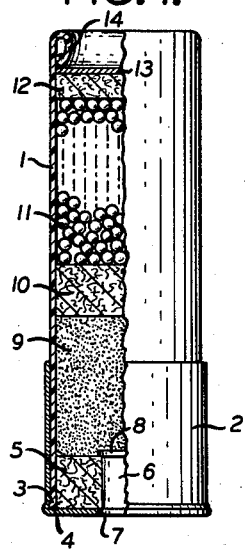
FIG. 1.
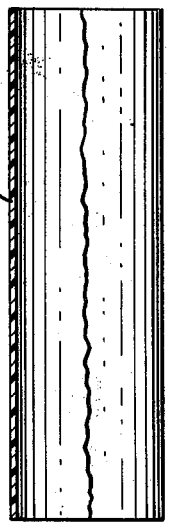
FIG. 2.
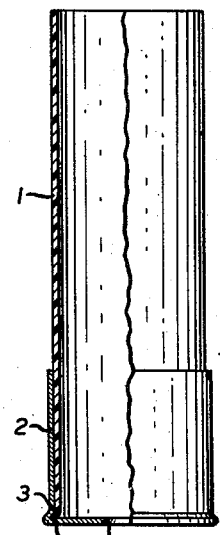
FIG. 3.
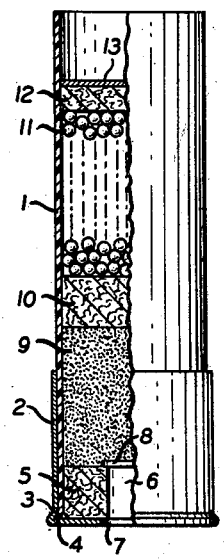
FIG. 4.
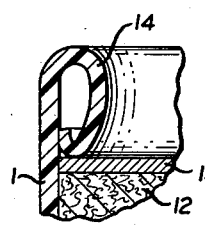
FIG. 5A.
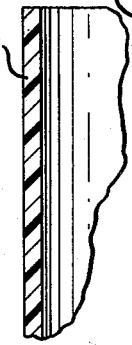
FIG. 5B.
FIG. 5C.
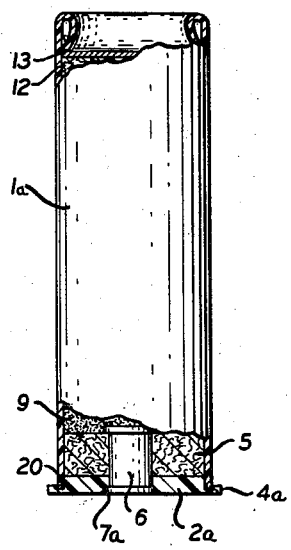
FIG. 6.
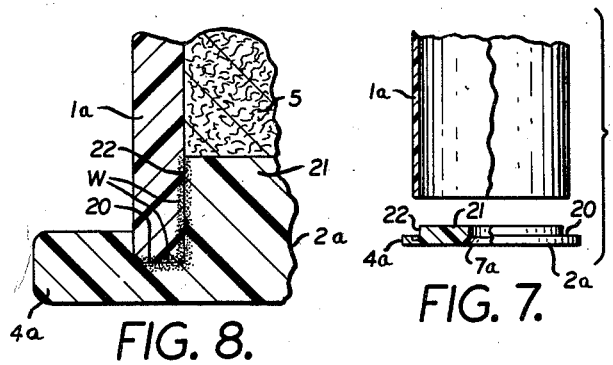
FIG. 8.  FIG. 7.
INVENTOR
William L. Young, Jr
BY
Robert J. Patterson
ATTORNEY Oct. 1, 1963  W. L. YOUNG, JR  3,105,439
PLASTIC SHOT GUN SHELL Filed July 9, 1959  2 Sheets-Sheet 2

POOR ELONGATION

BETTER ELONGATION

BEST ELONGATION

INVENTOR.
WILLIAM L. YOUNG, Jr.
BY Robert J. Patterson
ATTORNEY

United States Patent Office 3,105,439
Patented Oct. 1, 1963

3,105,439
PLASTIC SHOT GUN SHELL
William L. Young, Jr., 47 Cardinal Road,
Wyomissing, Pa.
Filed July 9, 1959, Ser. No. 826,083
7 Claims. (Cl. 102—43)

This invention relates to extruded thermoplastic firearm munition shells. More particularly, it relates to such shells having an extruded tubular thermoplastic wall element and a base affixed thereto, preferably a thermoplastic base affixed by solvent welding. Further, it relates to a method of "normalizing" the tubular wall element of my shell during the extrusion process so as to increase biaxially the percentage ultimate elongation of said element.

This application is a continuation-in-part of my application Serial No. 730,836, filed April 25, 1958, now abandoned.

The typical shot gun shell, as used for many years, has a wax-impregnated paper or pasteboard tubular container element which is fixed to a brass base. Such shells while generally satisfactory, have shortcomings in economy of manufacture, in imperviousness to moisture, and in performance in the barrel of the gun.

Molded plastic shells, such as the cellulose ester plastic shell disclosed by A. F. Du Pont in U.S. Patent No. 1,605,655, issued November 2, 1926, are used to some extent but have not been found, in general, to possess sufficient advantage to replace the older paper-brass construction. Such molded plastic shells have found their major use in Europe because European sportsmen apparently prefer lighter shot guns which, correspondingly, require shells having smaller explosive charges. Typically, these molded shells can withstand muzzle pressures of about 5000 p.s.i. but will shoot-off and/or split when subjected to muzzle pressures of from 10,000 to 14,000 p.s.i. as required by manufacturers in the United States and even if constructed to accept 10,000 p.s.i., such molded shells become too expensive to make their manufacture economically practical.

Therefore, the general object of my invention is to provide an improved shot gun shell constructed partly or wholly of thermoplastic.

Another object is to provide such a shell which is interchangeable with the older pasteboard and brass shells and is useable in a comparable number of barrels of different models, and is capable of withstanding a muzzle pressure of at least 10,000 p.s.i.

Still another object is to provide a shot gun shell structure which eliminates a good part of the variability inherently present in the older shells and hence provides an improved and more uniform pattern.

Other objects of the invention are to provide an inexpensive extruded thermoplastic shell at a cost less than the conventional paper-brass shell in which wall failures such as shoot-offs and splitting are minimized and to provide a shell which will take printing neatly and permanently.

A shell embodying the invention in a preferred form will now first be described with reference to the accompanying drawing and the features forming the invention will then be pointed out in the appended claims.

In the drawing:

FIG. 1 is a view in central axial section to one side of the center line of a shell and in elevation to the other side;

FIG. 2 is a similar view of a tubular plastic shell wall element used in making the shell of FIG. 1;

FIGS. 3 and 4 are similar views showing progressive stages in the manufacture of the shell;

Figure 9:
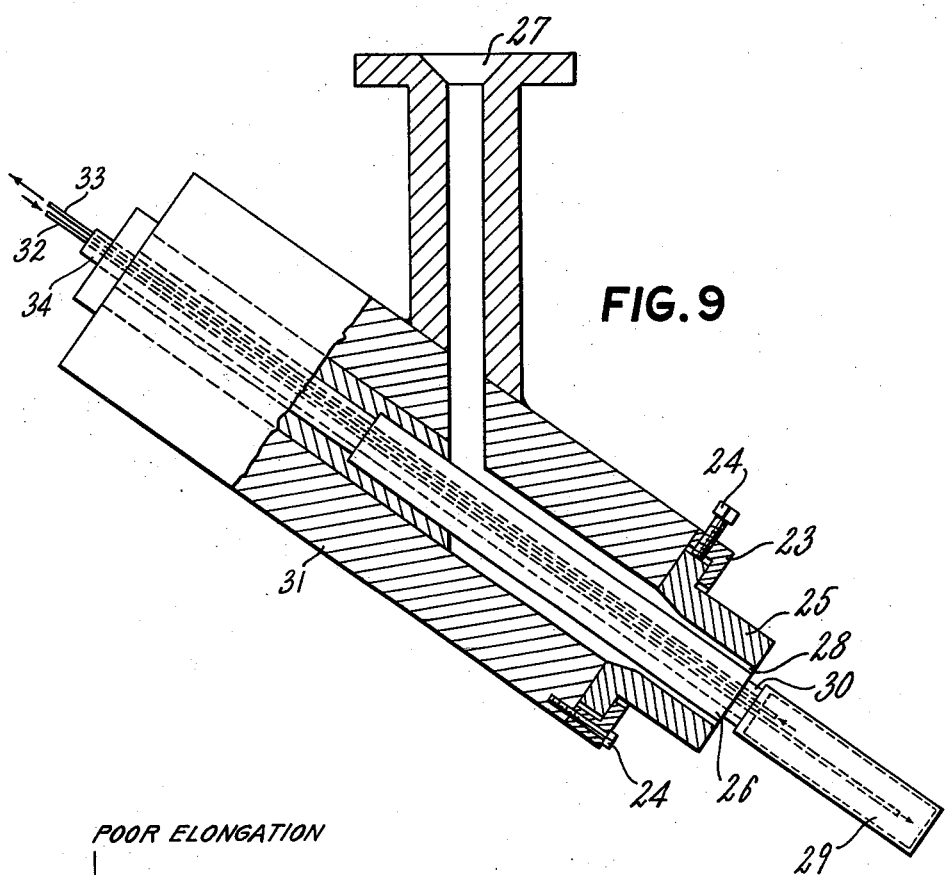
Figure 10A:
Figure 10B:
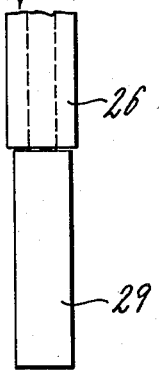
Figure 10C:
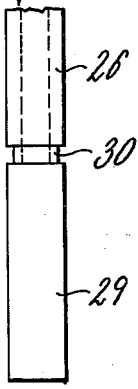

FIGS. 5-A to 5-C are enlarged fragmentary axial sections showing the action during the explosion at the rim of the discharge end of the shell;

FIG. 6 is a view partly in elevation and partly in axial section showing a modification of the shell of FIG. 1;

FIG. 7 is an exploded view showing parts of the shell of FIG. 6 prior to assembly;

FIG. 8 is a much enlarged fragmentary axial section of a part of the shell of FIG. 6;

FIG. 9 is a cross-sectional view of an extruder die body and mandrel used in making a normalized tubular element of my shell; and FIGS. 10-A to 10-C are cross-sectional views of various extruder pin-mandrel arrangements.

My invention in its broadest aspect is a firearm munitions shell having an extruded tubular thermoplastic wall element with a base affixed to the breach end of said element. Preferably the base is made of a thermoplastic formed into a suitable shape and secured to the wall element by solvent welding.

Referring now, first to FIGS. 1 to 5-C, there is there shown a shell of generally conventional construction, except that an extruded thermoplastic tubular wall element 1 has been substituted for the usual paraffin-impregnated paper wall. The brass end structure 2 is conventional and the tube 1 is held therein by expanding its lower or rearward rim 3 into a groove 4 formed in the brass end 2 where it is held securely by the wadding 5. The primer 6 is accommodated by a central opening 7 in the end 2 and is riveted over as at 8 on the other side of the wadding 5. The explosive charge 9 is held between wadding 5 and wadding layers 10, beyond which are the shot 11, further wadding 12, and end closure disc 13. The upper end of the tube 1 is curled over inwardly at the discharge end as indicated at 14 to retain the disc 13 and hold the contents of the shell in place.

In manufacturing the shell, a tubular piece of thermoplastic 1, as shown in FIG. 2, is first fixed in the brass base 2 by expanding its lower rim 3 as above-mentioned, producing the structure of FIG. 3 and the successive layers of wadding, explosive charge, shot and finally the closure disc 13 are placed in the shell, producing the structure of FIG. 4. The upper end of the tube 1 of FIG. 4 is now curled over inwardly to produce the structure of FIG. 1, using a conventional curling iron or die for this purpose.

The exterior of the shell of FIG. 1 may be made identical in dimensions and configuration to conventional shells, thus presenting no problem in obtaining full interchangeability.

I have found that the thermoplastics operative in my invention must have good toughness and mechanical strength. The tendency of the shell to fail by "shooting off" (tearing and firing of part of the tube 1 with the shot) is increased by increasing the ultimate elongation of the thermoplastic and, correspondingly, diminishing the impact strength, while the tendency of the shell to fail by splitting is increased by increasing the impact strength and, correspondingly, diminishing the elongation. In my experience use of thermoplastic ABS polymers, such as the ABS polymer marketed by the Naugatuck Chemical Division of the United States Rubber Company under the registered trademark "Kralastic," represents the best practice for any given design of shell. Such "Kralastic" ABS polymers are thermoplastic resin-rubber blends obtained by uniformly blending a resinous copolymer of a monomeric mixture consisting essentially of a vinyl aromatic compound, such as styrene, para-methyl styrene, alpha-methyl-p-methyl styrene, or a nuclearly chlorinated styrene, but preferably styrene itself, and an acrylonitrile, the vinyl aromatic compound being present in an amount more than 50% by weight of the monomers but generally not exceeding 90% thereof with a lesser amount of a rubbery copolymer of butadiene and acrylonitrile (i.e., NBR type rubber) wherein the acrylonitrile content is less than 50%. The blending of the resinous copolymer and the rubbery copolymer can be performed either by hot mastication of the solid polymers or by blending of latices of the separate polymers followed by coagulation, drying and mastication of the dried coagulum. In making the rubbery copolymer butadiene-1,3 is the preferred diene but substituted butadiene, such as isoprene and 2-chloro-butadiene, may be employed. These compositions are described in detail in U.S. Patent Nos. 2,439,202 and 2,550,139 to Daly, dated April 6, 1948, and April 24, 1951, respectively, and also in U.S. Patent No. 2,600,024 to Romeyn and Petras, dated June 10, 1953. Other materials such as the so-called "graft polymers" of acrylonitrile-butadiene-styrene described in U.S. Patent No. 2,820,773, issued January 21, 1958, to Childers and Fisk, may be added to these basic formulations or may be used separately providing such materials possess suitable mechanical strength and relatively high elongation for use in the present invention. Although I have described my invention with particular emphasis on ABS polymers, especially "Kralastic," as the material from which the tubular wall element and the base are formed, it will be apparent by those skilled in the art that in its broader aspects I am not restricted thereto but can use any suitable thermoplastic material having adequate physical properties, e.g. "Cycolac" which is the registered trademark of polymeric materials resulting from the interaction (graft) under polymerizing conditions of a conjugated diolefin polymer latex or a conjugated diolefin-vinyl aromatic copolymer latex with a mixture of an acrylonitrile and a vinyl aromatic marketed by the Marbon Chemical Division, Borg-Warner Corporation, cellulose ethers, such as ethyl cellulose, and cellulose esters, such as cellulose acetate.

The percentage ultimate elongation (or elongation at break) is the property which best characterizes the extruded tubular wall element of my shell. Although the percentage ultimate elongation is usually accompanied by tensile strength as a measure of toughness, both characteristics being obtained by ASTM D882-56T, it is sufficient of itself to characterize the thermoplastic formulations operative in my invention. Thermoplastic material having an elongation under standard ASTM test conditions of about 100% has been found most suitable for making my tubular wall element, and in general, materials having an elongation falling in a range from about 75% to 125% may be used. The control of physical properties obtainable is such that deterioration short of failure but sufficient to prevent reloading may be obtained in many cases, as, for example, in the case of a partial splitting or weakening at the discharge end of the shell. In these cases, a thermoplastic material having something less than the optimum properties is utilized and the range of elongation is, accordingly, expanded and may vary over a range from about 50% to 200%.

If the tubular wall element is extruded from the "Kralastic" material as received, without any additional treatment of the tubular wall element, the percentage ultimate elongation will not show any substantial increase from the elongation inherently present in the "Kralastic." Shells with thermoplastic tubular elements having elongations of about 35% (the elongation inherently present in most "Kralastic" formulations) cannot withstand the requisite muzzle pressures of about 10,000 p.s.i.

I have found that the elongation of a thermoplastic tubular wall element having elongation of less than 50% can be increased and equalized in the circumferential and axial directions by a technique which I call "normalizing." By means of this normalizing technique I have produced shot gun shells having "Kralastic" tubular elements with elongations as high as 200% in both directions.

"Normalizing" may be illustrated by reference to FIGS. 9 and 10–A to 10–C.

In FIG. 9 there is shown a typical extrusion die body with an adjusting ring 23 and screws 24 therefor which are used to position a die shell 25 to a point where the inner wall of said shell 25 is equal distant from the outer surface of a stationery and tubular die pin 26. Uniformity in the wall thickness of the extruded tubular element may be maintained in this manner and controlled throughout the extrusion process. Thermoplastic polymer is fed into the die body at the funnel-like opening 27 wherein it flows down and over the die pin 26 on its way to the annular space at the point of extrusion between the outer surface of said pin 26 and the inner surface of the die shell 25, which I prefer to call the die orifice 28. As the extrudate leaves the die orifice 28, it passes onto a water-cooled mandrel 29. The mandrel is water cooled by passing cold tap water into line 32, which line extends through the center of the die body 31 and into the mandrel 29, and out through line 33, said lines being positioned and secured to the back of die body 31 by a nut 34. The thickness of the extrudate is reduced as it is deposited on the cooled mandrel 29. The reduced thickness of the extrudate is achieved by the conventional technique of pulling the extrudate over the mandrel 29 after coming out of the die orifice 28. If the die orifice 28 is maintained at a thickness which is from 20% to 35% greater than the wall thickness of the finished tube, increased circumferential elongation of the finished tube will result. However, in order to produce a suitable tube both circumferential elongation and axial elongation must be increased so that each is within the limits of from about 50 to 200%, preferably from about 75 to 125%, and equalized. Axial elongation of the tubular element is increased and equated to the increased circumferential elongation by drafting the hot extrudate while passing from a die pin 26 to a mandrel 29 having an outside diameter less than the outside diameter of the pin 26 at the point of contact between said mandrel and said pin. The structure or mandrel-pin arrangement which causes this drafting is illustrated in FIG. 10–B. If the mandrel 29 and pin 26 are of the same outside diameter as illustrated in FIG. 10–A, no substantial increase in axial elongation is obtained. For maximum axial elongations the outside diameter of the mandrel 29 should be 1% to 5% less than the outside diameter of the die pin 26 at their point of contact i.e. the point where the mandrel 29 abuts the die pin 26. Equalization of the circumferential and axial elongations by reason of this drafting step may be attributed to an anisotropic qualities of extruded thermoplastic, and particularly ABS polymer. By this I mean that if the extruded tube is suddenly chilled to hasten the set-up of ABS polymer extrudate by spraying or cascading cold water over the tube as it emerges from the die orifice 26 onto the mandrel 29, the resulting tube will not show an increment in elongation and will have different properties in the circumferential and axial directions because the rubber-resin molecules are oriented and fixed in the direction of extrusion. I regulate orientation in the other direction by my unique combination of die pin-mandrel arrangement, mandrel construction, and cooling technique. Consequently, the extruded tube is not flooded with cold water until the drafting of the extruded tube is complete. In order to decrease the partial cooling and set-up of the extrudate which occurs when the tubular extrudate contacts the metallic mandrel surface, particularly on the inner surface of the tube, I have found it advantageous to reduce the cooling surface area by employing a mandrel with a knurled outer surface.

FIG. 10–C illustrates a more preferred arrangement of die pin 26 and mandrel 29 by which I have been consistently able to obtain high elongations. In this arrangement the die pin 26 and mandrel 29 are equivalent in outside diameter. I connect these elements by a coupling 30 of nylon or other suitable material which has an outside diameter of from 1% to 5% less than the outside diameter of the die pin 26 and mandrel 29. Generally, I use a mandrel about 5 inches in length and a coupling 30 which is about 5% to 10% of mandrel size in length, e.g., from ½ inch to ¾ inch in length. Apparently, the coupling 30 provides a free-space or area of no-contact for the extrudate wherein before any cooling occurs the extrudate tends to become oriented in the direction opposite to the movement of the tube.

The wall thickness of the shell generally is about .025 inch or even less. It is to be noted that increased wall thickness while it tends to reduce failure due to shoot-off does not essentially strength the structure as against splitting.

FIGS. 5–A—5–C illustrate in a schematic way the action at the discharge end of the shell, the curled end 14 being first rolled back as shown in FIG. 5–B and then straightened out as shown in FIG. 5–C. The resistance offered by the curled end 14 may be very simply and accurately controlled by the extent of curling and the conditions under which the curling is done as to temperature and otherwise. As to this, and as to the dimensions and construction of the shell generally, a much more precise and predictable container is provided, permitting the obtaining of a more predictable pattern than that obtained with the conventional shell and, hence, improved performance in the barrel. Furthermore, it appears that my extruded plastic tube reduces friction so that equivalent muzzle velocity can be obtained with less p.s.i., i.e., a smaller charge.

As will be understood, the base 2 may be made in any usual length and may also be made of materials other than brass, as, for example, any of various plastics including "Kralastic" or metals other than brass, where found convenient.

The entire shell casing may be made of thermoplastic producing a markedly improved structure as shown in the modification illustrated in FIGS. 6–8. In the structure of those figures, the tubular plastic wall element 1–a may be identical in general with the element 1 of FIG. 1 and the loading of the shell may also be identical. In this case, however, a plastic end structure 2–a (which may be made of the same thermoplastic as the tubular wall element or of any other similar plastic compatible with and weldable to the tubular wall element) is substituted for the brass end 2 of FIG. 1. The external configuration of this element as to its flange 4–a and center hole 7–a for taking the primer 6 may be identical with the brass end 2. However, the end 2–a is formed with a recessed surface 20 against which the end of tube 1–a seats (FIGS. 7 and 8) and with a reduced section 21 above the flange 4–a having an exterior cylindrical surface 22 fitting inside the end of the element 1–a. The tube 1–a is joined to the base or end 2–a by welding, as indicated at W, to the recessed surface 20 and cylindrical surface 22, the welding being accomplished either by heat (heating of the diathermy type being particularly suitable) or by use of a suitable solvent. This recessed surface 20 increases the contact for the weld and provides a recess for excess solvent or cement. Where the base and tubular wall element are both formed of "Kralastic," methyl ethyl ketone is a suitable solvent. In either case a moisture and gas tight joint having strength equal to or exceeding the strength of the material itself is produced. Accordingly, a moisture-proof shell may be made without requiring the use of paraffin or other sealing agent. The base 2–a may be produced in any convenient manner as by injection or other molding but is very conveniently manufactured on an ordinary screw machine from extruded rod.

The curled over rim 14 at the discharge end of the shell, which rim is the same in both embodiments illustrated in the drawing, may be sealed to the disc 13 by the use of a suitable solvent or coating material and produces a shell of improved moisture-proof properties, since the regularity and uniformity of the plastic curled end permits the formation of a better seal to the disc than may be had with the ordinary paper walled shell.

The following is a comparison of firing data between extruded normalized "Kralastic" shells (A, B, D and E) and the conventional paper walled shell C and molded plastic shell F. The "Kralastic" was a uniform granular mixture of (A) 65 parts by weight of a resinous copolymer of 70 percent by weight of monomeric styrene and 30 percent by weight of monomeric acrylonitrile, this resinous copolymer having an intrinsic viscosity in dimethylformamide of 1.2–1.5, and (B) 35 parts by weight of a rubbery copolymer of 38 percent by weight of acrylonitrile and 62 percent by weight of butadiene, this rubbery copolymer being sold commercially as "Paracril 2806." This "Kralastic" was converted into 12 gauge shot gun shells having a wall thickness of about .025 inch by the herein-described technique of extruding a tube and normalizing said tube, cutting the tube to the requisite length, and affixing an injection molded base of "Kralastic" by solvent welding. Shell F is a foreign made shell molded from thermoplastic and possibly ABS thermoplastic. The 12 gauge "Kralastic" shells were loaded with shot (1¼ oz. No. 6 shot) and were fitted with Western No. 209 primers. A Winchester pressure barrel shot gun having a 30 inch barrel was employed.

| Shell | Velocity, f.p.s. | Muzzle pressure, p.s.i. |
| --- | --- | --- |
| A | 1,327 | 9,400 |
| B | 1,322 | 10,000 |
| C | 1,288 | 6,800 |
| D | 1,357 | 7,300 |
| E | 1,333 | 6,800 |
| F | 1,136 | 5,000 |

None of the shells listed in the above table showed any indication of shoot-off or splitting after firing. The shell designated B shows that my shells can take the requisite muzzle pressure of at least 10,000 p.s.i. The shells designated D and E are similar to A and B except for the fact that a lesser charge was employed. D and E show that high muzzle velocities are maintained when the charge was reduced to the same order of magnitude as the paper walled shell C. F illustrates that molded plastic shells will not split or shoot-off if given a smaller charge (in this case one-half the charge of my extruded shell).

While especially adapted to the construction of shot gun shells, it will be apparent that the structure of FIGS. 6–8 involving the use of an extruded thermoplastic case bonded to a plastic base or end, may also be used in the construction of rifle cartridge casings heretofore made entirely of metal, the casing and base structure in the shot gun shell not differing essentially from cartridges or other types in this respect.

It is understood that the description of this invention is illustrative thereof and that variations may be made, particularly with respect to various techniques which may be employed to "normalize" or orient the operative thermoplastics, which are, nevertheless, within the scope of my invention as defined in the appended claims.

Having thus described my invention, what I claim and desire to protect by Letters Patent is:

1. A shot gun shell comprising a normalized extended thermoplastic tubular element comprised of copolymers of vinyl aromatic compound and a minor proportion of an acrylonitrile, said copolymers being in admixture with a lesser amount of rubbery copolymers of butadiene and a minor proportion of acrylonitrile, said tubular element having a wall thickness throughout of substantially .025 inch and an axial and circumferential elongation in the range of about 50% to about 200%, said tubular element further having a discharge end, which is curled radially inwardly and a breech end to which a base is affixed, said tubular element being prepared by extruding the thermoplastic material over a die pin and through an annular opening onto a mandrel attached thereto, said mandrel having a diameter less than the diameter of the die pin, pulling the extrudate at a predetermined rate over a free space between the die pin and mandrel, whereby the thickness of the final extrudate is reduced from the initial thickness of the extrudate at the die pin.

2. A shot gun shell in accordance with claim 1, wherein the base is comprised of an acrylonitrile resin-rubber thermoplastic.

3. A shot gun shell in accordance with claim 1, wherein the base comprises a flange seating the casing element and a reduced position above the flange and fitting in the casing element.

4. A shot gun shell comprising a normalized extruded thermoplastic tubular element having a wall thickness throughout of substantially .025 inch and an axial and circumferential elongation in the range of about 50 to about 200%, and a base affixed thereto, said tubular element being prepared by extruding a thermoplastic material over a die pin and through an annular opening onto a mandrel attached thereto, said mandrel having a diameter less than the diameter of the die pin, pulling the extrudate at a predetermined rate over a free space between the die pin and mandrel, whereby the thickness of the final extrudate is reduced from the initial thickness of the extrudate at the die pin.

5. A shot gun shell comprising a normalized extruded thermoplastic tubular element having a wall thickness throughout of substantially .025 inch and an axial and circumferential elongation of at least 75%, and a base affixed thereto, said tubular element being prepared by extruding a thermoplastic material over a die pin and through an annular opening onto a mandrel attached thereto, said mandrel having a diameter less than the diameter of the die pin, pulling the extrudate at a predetermined rate over a free space between the die pin and mandrel, whereby the thickness of the final extrudate is reduced from the initial thickness of the extrudate at the die pin.

6. A shot gun shell comprising a normalized extruded thermoplastic tubular element in accordance with claim 5, said tubular element having a discharge end which is curled radially inwardly, and a breech end to which the base is affixed.

7. A shot gun shell in accordance with claim 5, wherein the base comprises a thermoplastic flange seating the end of the tubular element and welded thereto.

References Cited in the file of this patent

UNITED STATES PATENTS

| | | |
|---|---|---|
| 1,605,655 | Du Pont | Nov. 2, 1926 |
| 2,232,634 | Roberts et al. | Feb. 18, 1941 |
| 2,550,139 | Daly | Apr. 24, 1951 |
| 2,634,459 | Irons | Apr. 14, 1953 |
| 2,708,772 | Moncrieff | May 24, 1955 |
| 2,750,631 | Johnson | June 19, 1956 |
| 2,814,071 | Allan et al. | Nov. 26, 1957 |
| 2,818,810 | Reynolds | Jan. 7, 1958 |

FOREIGN PATENTS

| | | |
|---|---|---|
| 1,029,586 | France | Mar. 11, 1953 |
| 765,904 | Great Britain | Jan. 16, 1957 |